US012759621B2

(12) United States Patent
Miyake et al.

(10) Patent No.: US 12,759,621 B2
(45) Date of Patent: Oct. 13, 2026

(54) STEERING CONTROL DEVICE AND STEERING CONTROL METHOD

(71) Applicants: JTEKT CORPORATION, Kariya (JP); TOYOTA JIDOSHA KABUSHIKI KAISHA, Toyota (JP)

(72) Inventors: Junya Miyake, Okazaki (JP); Shunsuke Yoshida, Nisshin (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 18/910,450

(22) Filed: Oct. 9, 2024

(65) Prior Publication Data

US 2025/0128758 A1 Apr. 24, 2025

(30) Foreign Application Priority Data

Oct. 19, 2023 (JP) ................................ 2023-180302

(51) Int. Cl.
*B62D 5/04* (2006.01)

(52) U.S. Cl.
CPC .................................. *B62D 5/0469* (2013.01)

(58) Field of Classification Search
CPC ...... B62D 5/0469; B62D 6/002; B62D 5/001; B62D 5/008; B62D 5/04; B62D 5/0421; B62D 5/046
See application file for complete search history.

(56) References Cited

U.S. PATENT DOCUMENTS

| | | | | |
|---|---|---|---|---|
| 8,386,090 | B1 * | 2/2013 | Hobbs, Jr. | E02F 9/2058 701/2 |
| 2011/0303478 | A1 | 12/2011 | Ellis et al. | |
| 2013/0075185 | A1 * | 3/2013 | Sugai | B62D 6/008 180/402 |
| 2016/0347356 | A1 | 12/2016 | Matsuda et al. | |
| 2018/0178827 | A1 * | 6/2018 | Araki | B62K 21/00 |
| 2020/0130728 | A1 * | 4/2020 | Takashima | B62D 5/0457 |

(Continued)

FOREIGN PATENT DOCUMENTS

| | | | |
|---|---|---|---|
| DE | 102020121912 | A1 | 6/2021 |
| EP | 4155138 | A1 | 3/2023 |

(Continued)

OTHER PUBLICATIONS

Mar. 11, 2025 Extended Search Report issued in European Patent Application No. 24206688.4.

*Primary Examiner* — Joseph J Dallo
(74) *Attorney, Agent, or Firm* — Oliff PLC

(57) ABSTRACT

A steering control device is configured to control a steering device. The steering device includes a turning shaft and a turning motor. The turning shaft is configured to turn a turning wheel of a vehicle. Dynamic power transmission between the turning shaft and a steering wheel is separated. The steering control device includes a processing device. The processing device is configured to control drive of the turning motor depending on a steering state of the steering wheel. The processing device is configured to execute a lock process based on a command from an exterior, in a state where the steering device is equipped in the vehicle. The lock process is a process of driving the turning motor such that the position of the turning shaft is kept at a particular position.

6 Claims, 2 Drawing Sheets

(56) References Cited

U.S. PATENT DOCUMENTS

| | | | | |
|---|---|---|---|---|
| 2023/0059965 | A1 | 2/2023 | Nakakuki et al. | |
| 2024/0124047 | A1* | 4/2024 | Matsumoto | B62D 5/006 |
| 2024/0227933 | A1* | 7/2024 | Kakas | B62D 15/025 |

FOREIGN PATENT DOCUMENTS

| | | | | | |
|---|---|---|---|---|---|
| EP | 4375162 | A1 | | 5/2024 | |
| JP | 2016-109464 | A | | 6/2016 | |
| WO | WO-2006128900 | A1 | * | 12/2006 | B60R 25/04 |
| WO | WO-2014203574 | A1 | * | 12/2014 | B62D 7/1509 |
| WO | 2023/046270 | A1 | | 3/2023 | |

* cited by examiner

STEERING CONTROL DEVICE AND STEERING CONTROL METHOD

CROSS-REFERENCE TO RELATED APPLICATION

This application claims priority to Japanese Patent Application No. 2023-180302 filed on Oct. 19, 2023. The disclosure of the above-identified application, including the specification, drawings, and claims, is incorporated by reference herein in its entirety.

BACKGROUND

1. Technical Field

The present disclosure relates to a steering control device and a steering control method.

2. Description of Related Art

In a production process for a vehicle, there is a step of adjusting a wheel alignment. For example, Japanese Unexamined Patent Application Publication No. 2016-109464 describes that the wheel alignment of the vehicle is adjusted using a wheel alignment adjustment device. The wheel alignment adjustment device measures the attitude of the vehicle, the wheel alignment, and a steering angle, and calculates a correction amount for the wheel alignment based on the measurement results. The wheel alignment is adjusted in consideration of the correction amount.

SUMMARY

In the case of a vehicle that is equipped with an electric power steering device, a steering wheel is kept at a steering neutral position, in the step of adjusting the wheel alignment. In the electric power steering device, the steering wheel and a turning shaft are coupled such that dynamic power transmission is possible, and therefore, the turning shaft is kept at a neutral position.

However, in the case of a vehicle that is equipped with a steer-by-wire type steering device, the dynamic power transmission between the steering wheel and the turning shaft is separated. Therefore, even when the steering wheel is kept at the steering neutral position, the turning shaft is not always kept at the neutral position. Therefore, there is a fear that the wheel alignment cannot be appropriately adjusted.

There is a possibility that the turning shaft is demanded to be kept at a particular turning position different from the neutral position, depending on the work content relevant to the maintenance of the vehicle. In this case, similarly to the case where the turning shaft is kept at the neutral position, there is a concern that the turning shaft is not kept at the particular turning position and the maintenance or adjustment of the vehicle cannot be appropriately performed.

A steering control device according to a first aspect of the present disclosure is configured to control a steering device including: a turning shaft configured to turn a turning wheel of a vehicle, dynamic power transmission between the turning shaft and a steering wheel being separated; and a turning motor configured to generate a torque that is given to the turning shaft. The steering control device includes a processing device. The processing device is configured to control drive of the turning motor depending on a steering state of the steering wheel. The processing device is configured to execute a lock process based on a command from an exterior, in a state where the steering device is equipped in the vehicle. The lock process is a process of driving the turning motor such that the position of the turning shaft is kept at a particular position.

For example, when the maintenance of the vehicle is performed, the position of the turning shaft is sometimes demanded to be kept at a particular position. In the above configuration, the lock process is executed based on the command from the exterior, and thereby, the position of the turning shaft is kept at the particular position. Therefore, the maintenance of the vehicle can be appropriately performed.

In the above steering control device, the lock process may be a process of driving the turning motor such that the position of the turning shaft is kept at the particular position, regardless of the steering state of the steering wheel.

In the above configuration, the position of the turning shaft is kept at the particular position based on the command from the exterior, regardless of the steering state of the steering wheel. Therefore, even in the case where the steering wheel unintentionally operates when the maintenance of the vehicle is performed, it is possible to reduce the influence of the operation of the steering wheel on the maintenance of the vehicle.

In the above steering control device, the particular position may be a neutral position of the turning shaft, the neutral position corresponding to a straight movement state of the vehicle. In the above configuration, the position of the turning shaft can be kept at the neutral position. Therefore, it is possible to appropriately perform a work that is relevant to the maintenance of the vehicle and for which the straight movement property of the vehicle is demanded to be ensured.

In the above steering control device, the particular position may be an end position that is a limit position in a physically movable range of the turning shaft. Depending on the work content for the maintenance, the position of the turning shaft is demanded to be kept at the end position. In the above configuration, it is possible to meet the demand depending on the work content for the maintenance.

In the above steering control device, the processing device may be configured to execute the lock process when the vehicle is at a stop. In the above configuration, the lock process is performed in a state where the vehicle is at a stop. Therefore, it is possible to keep the position of the turning shaft at the particular position, while securing safety.

A steering control method according to a second aspect of the present disclosure is a method for controlling a steering device including: a turning shaft configured to turn a turning wheel of a vehicle, dynamic power transmission between the turning shaft and a steering wheel being separated; and a turning motor configured to generate a torque that is given to the turning shaft. The steering control method includes executing a lock process by a processing device, based on a command from an exterior, in a state where the steering device is equipped in the vehicle. The lock process is a process of driving the turning motor such that the position of the turning shaft is kept at a particular position, regardless of a steering state of the steering wheel.

For example, when the maintenance of the vehicle is performed, the position of the turning shaft is sometimes demanded to be kept at a particular position. In the above method, the lock process is executed based on the command from the exterior, and thereby, the position of the turning shaft is kept at the particular position. Therefore, the maintenance of the vehicle can be appropriately performed.

With the steering control device according to the first aspect of the present disclosure and the steering control method according to the second aspect of the present disclosure, the maintenance of the vehicle can be appropriately performed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of a steering control device and a steering control method will be described below.

Overall Configuration

Figure 1:
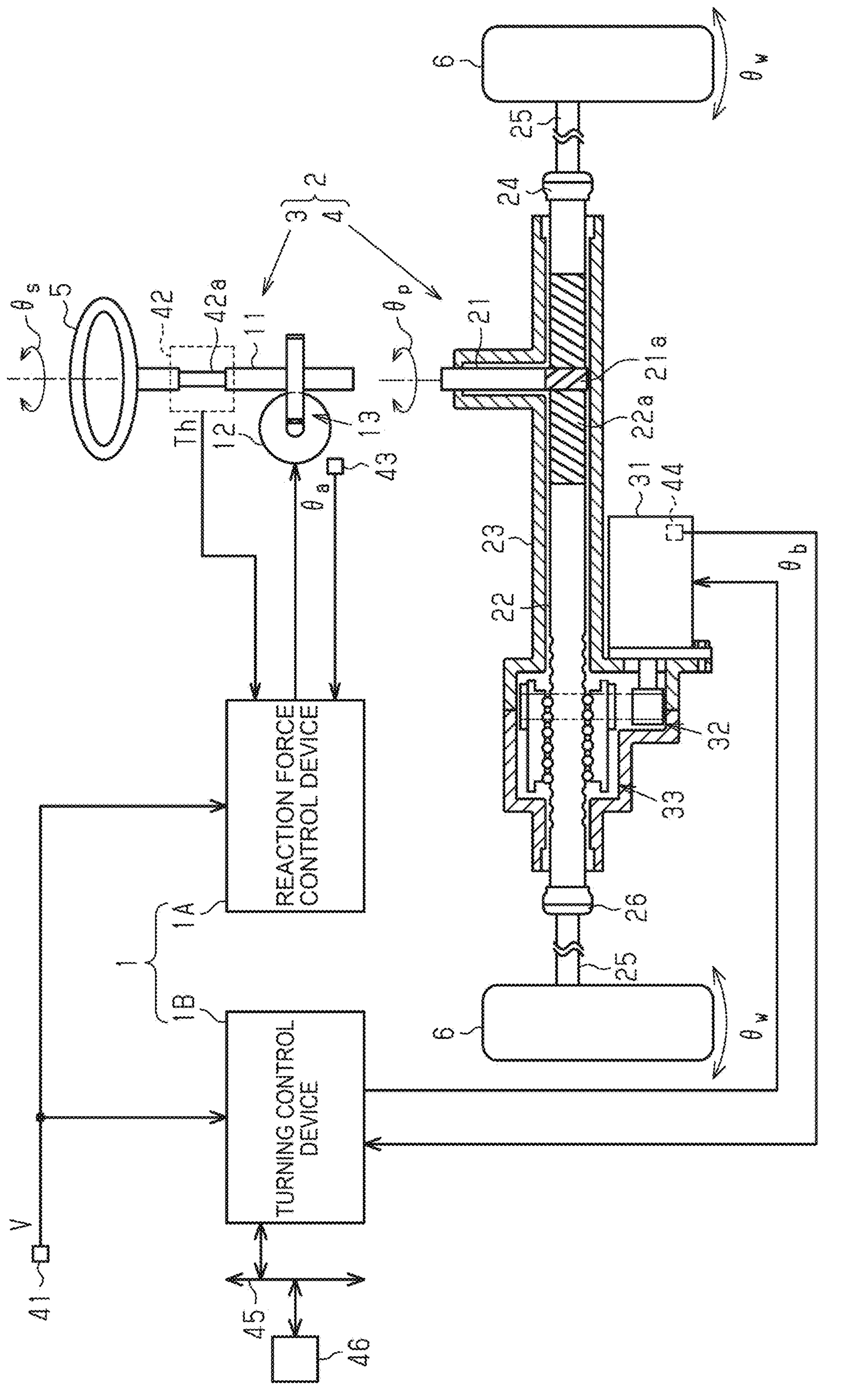
FIG. 1 is a configuration diagram of a steering device that is equipped with an embodiment of a steering control device.

As shown in FIG. 1, a controlled object of a steering control device 1 is a steer-by-wire type steering device 2. The steering device 2 includes a steering mechanism 3 and a turning mechanism 4. The steering mechanism 3 is a working part that is steered by a driver through a steering wheel 5. The turning mechanism 4 is a working part that turns turning wheels 6 of a vehicle in response to the steering of the steering wheel 5. The steering control device 1 includes a reaction force control device 1A and a turning control device 1B. A controlled object of the reaction force control device 1A is the steering mechanism 3. The reaction force control device 1A executes a reaction force control. A controlled object of the turning control device 1B is the turning mechanism 4. The turning control device 1B executes a turning control.

The steering mechanism 3 includes a steering shaft 11, a reaction force motor 12, and a speed reducer 13. The steering wheel 5 is coupled to the steering shaft 11, in an integrally rotatable manner. The reaction force motor 12 is a generation source of a steering reaction force that is given to the steering shaft 11. The steering reaction force is a force in the opposite direction of the steering direction of the steering wheel 5. For example, the reaction force motor 12 is a three-phase brushless motor. The speed reducer 13 reduces the speed of the rotation of the reaction force motor 12, and transmits the rotation after the speed reduction, to the steering shaft 11.

The turning mechanism 4 includes a pinion shaft 21, a turning shaft 22, and a housing 23. The housing 23 supports the pinion shaft 21 in a rotatable manner. Further, the housing 23 houses the turning shaft 22 in a reciprocable manner. The dynamic power transmission between the turning shaft 22 and the steering wheel 5 is separated. The pinion shaft 21 is provided so as to cross the turning shaft 22. A pinion tooth 21*a* of the pinion shaft 21 engages with a rack tooth 22*a* of the turning shaft 22. Tie rods 25 are coupled to both ends of the turning shaft 22, through rack ends 24, 26 that are constituted by ball joints. Distal ends of the tie rods 25 are coupled to unillustrated knuckles that are attached to the turning wheels 6.

The turning mechanism 4 includes a turning motor 31, a transmission mechanism 32, and a conversion mechanism 33. The turning motor 31 is a generation source of a turning force that is given to the turning shaft 22. The turning force is a force for turning the turning wheels 6. For example, the turning motor 31 is a three-phase brushless motor. For example, the transmission mechanism 32 is a belt transmission mechanism. The transmission mechanism 32 transmits the rotation of the turning motor 31 to the conversion mechanism 33. For example, the conversion mechanism 33 is a ball screw mechanism. The conversion mechanism 33 converts the rotation transmitted through the transmission mechanism 32, into the motion of the turning shaft 22 in the axial direction of the turning shaft 22.

By the movement of the turning shaft 22 in the axial direction, a tuning angle $\theta_w$ of the turning wheels 6 is altered. The pinion tooth 21*a* of the pinion shaft 21 engages with the rack tooth 22*a* of the turning shaft 22, and therefore, rotates in conjunction with the movement of the turning shaft 22. The pinion shaft 21 is a shaft or rotation body that rotates in conjunction with the turning operation of the turning wheels 6.

The reaction force control device 1A controls the operation of the reaction force motor 12. The reaction force control device 1A includes a processing circuit that includes one of the following three configurations A1, A2, and A3.

A1. One or more processors that operate in accordance with computer programs as software. Each processor includes a central processing unit (CPU) and a memory.

A2. One or more dedicated hardware circuits that execute at least some processes of various processes, as exemplified by application specific integrated circuits (ASICs). Each ASIC includes a CPU and a memory.

A3. Hardware circuits in which the configuration A1 and the configuration A2 are combined.

The memory is a computer-readable medium, and stores programs in which processes or instructions for a computer are written. In the embodiment, the computer is a CPU. The memory includes a random access memory (RAM) and a read only memory (ROM). The CPU executes various controls by executing programs stored in the memory with a predetermined computation period.

The reaction force control device 1A takes detection results of sensors that are equipped in the vehicle. The sensors include a vehicle velocity sensor 41, a torque sensor 42, and a rotation angle sensor 43.

The vehicle velocity sensor 41 detects a vehicle velocity V. The vehicle velocity V is a state variable that reflects the traveling state of the vehicle. The torque sensor 42 is provided at the steering shaft 11. The torque sensor 42 is positioned on the side of the steering wheel 5, relative to a coupling portion of the speed reducer 13 on the steering shaft 11. The torque sensor 42 detects a steering torque Th that is given to the steering shaft 11. The steering torque Th is computed based on the torsion amount of a torsion bar 42*a* that is provided at the steering shaft 11. The rotation angle sensor 43 is provided at the reaction force motor 12. The rotation angle sensor 43 detects a rotation angle $\theta_a$ of the reaction force motor 12.

The reaction force control device 1A controls the operation of the reaction force motor 12, using the detection results of the vehicle velocity sensor 41, the torque sensor 42, and the rotation angle sensor 43. The reaction force control device 1A controls the electricity supply to the reaction force motor 12, so as to cause the reaction force motor 12 to generate the steering reaction force depending on the steering torque Th. The reaction force control device 1A is a processing device that controls the drive of the reaction force motor 12 depending on the steering state of the steering wheel 5.

The turning control device 1B controls the operation of the turning motor 31. Similarly to the reaction force control device 1A, the turning control device 1B includes a processing circuit that includes one of the above three configurations A1, A2, and A3. The turning control device 1B takes detection results of sensors that are equipped in the vehicle. The sensors include a rotation angle sensor 44. The rotation angle sensor 44 is provided at the turning motor 31. The rotation angle sensor 44 detects a rotation angle $\theta_b$ of the turning motor 31.

The turning control device 1B controls the operation of the turning motor 31, using the detection result of the rotation angle sensor 44. The turning control device 1B controls the electricity supply to the turning motor 31, such that the turning wheels 6 are turned depending on the steering state of the steering wheel 5. The turning control device 1B is a processing device that controls the drive of the turning motor 31 depending on the steering state of the steering wheel 5.

The reaction force control device 1A and the turning control device 1B are connected to an in-vehicle network 45. For explanatory convenience, in FIG. 1, the connection state between the reaction force control device 1A and the in-vehicle network 45 is not illustrated. For example, the in-vehicle network 45 is a controller area network (CAN). To the in-vehicle network 45, an external tool 46 can be connected. The external tool 46, the reaction force control device 1A, and the turning control device 1B exchange information with each other through the in-vehicle network 45.

The external tool 46 is an external apparatus, and for example, is a portable terminal that is carried by a worker that performs the assembly of the vehicle or the maintenance of the vehicle. The maintenance of the vehicle includes the maintenance of the steering device 2. In addition, the maintenance of the vehicle includes various evaluations and the like. The external tool 46 may be a notebook-sized personal computer. The personal computer includes a processing circuit that includes one of the above three configurations A1, A2, and A3. Further, the external tool 46 includes an input device, an output device, a storage device, and a communication device.

The input device includes a keyboard and a mouse, and is used for the input of a demand or instruction from the worker. The output device includes a display device and a speaker, and outputs a variety of information. The storage device is an auxiliary storage device such as a hard disk, and stores a variety of programs and data that are needed for the maintenance of the vehicle. The communication device performs communication through the in-vehicle network 45. In response to the demand or instruction input through the input device, a CPU transfers a variety of programs and data to a memory, executes a variety of programs, and thereby, executes processes that are needed for the maintenance of the vehicle.

For example, the external tool 46 gives an instruction of the execution or termination of a lock process, to the turning control device 1B. The lock process is a process for keeping the turning shaft 22 at a particular position. For example, the particular position is a neutral position of the turning shaft 22. The neutral position is a position of the turning shaft 22 that corresponds to a straight movement state of the vehicle. For example, the external tool 46 sets the value of a turning keeping flag FG, through the operation by the worker. The value of the turning keeping flag FG is a command to the turning control device 1B. In the case where the execution of the lock process is started, the external tool 46 sets the value of the turning keeping flag FG to "ON". In the case where the execution of the lock process is ended, the external tool 46 sets the value of the turning keeping flag FG to "OFF".

Configuration of Reaction Force Control Device 1A

Next, the configuration of the reaction force control device 1A will be described.

Figure 2:
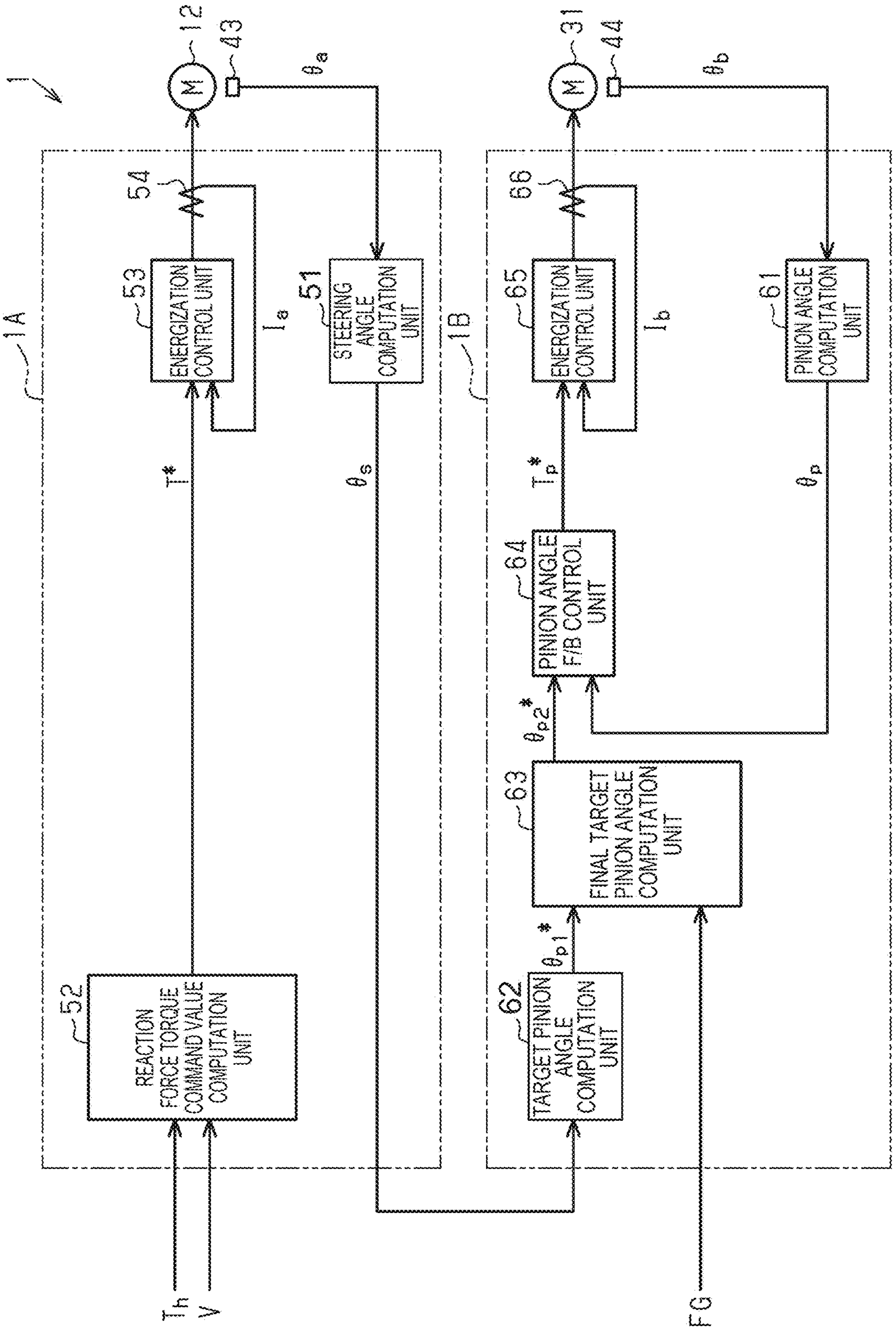
FIG. 2 is a block diagram showing a reaction force control device and a turning control device according to the embodiment.

As shown in FIG. 2, the reaction force control device 1A includes a steering angle computation unit 51, a reaction force torque command value computation unit 52, and an energization control unit 53.

The steering angle computation unit 51 computes a steering angle $\theta_s$ of the steering wheel 5, based on the rotation angle $\theta_a$ of the reaction force motor 12 that is detected through the rotation angle sensor 43.

The reaction force torque command value computation unit 52 computes a reaction force torque command value T* based on the steering torque Th and the vehicle velocity V. The reaction force torque command value T* is a target value of the steering reaction force that is generated by the reaction force motor 12. The steering reaction force is a torque in the opposite direction of the steering direction of the steering wheel 5. The absolute value of the reaction force torque command value T* is larger as the absolute value of the steering torque Th is larger and the vehicle velocity V is lower.

The energization control unit 53 supplies an electric power depending on the reaction force torque command value T*, to the reaction force motor 12. Specifically, the energization control unit 53 computes a current command value for the reaction force motor 12, based on the reaction force torque command value T*. The energization control unit 53 detects the value of an electric current $I_a$ that is generated on an electricity supply path to the reaction force motor 12, through a current sensor 54 provided on the electricity supply path. The value of the electric current $I_a$ is the value of the electric current that is supplied to the reaction force motor 12. The energization control unit 53 evaluates the deviation between the current command value and the value of the electric current $I_a$, and controls the electricity supply to the reaction force motor 12 such that the deviation is eliminated. Thereby, the reaction force motor 12 generates the torque depending on the reaction force torque command value T*.

Configuration of Turning Control Device 1B

Next, the configuration of the turning control device 1B will be described. As shown in FIG. 2, the turning control device 1B includes a pinion angle computation unit 61, a target pinion angle computation unit 62, a final target pinion angle computation unit 63, a pinion angle feedback control unit 64, and an energization control unit 65.

The pinion angle computation unit 61 computes a pinion angle $\theta_p$, based on the rotation angle $\theta_b$ of the turning motor 31 that is detected through the rotation angle sensor 44. The pinion angle $\theta_p$ is the rotation angle of the pinion shaft 21, and corresponds to a real angle that is the actual angle of the pinion shaft 21. The turning motor 31 and the pinion shaft 21 interlock through the transmission mechanism 32, the conversion mechanism 33, and the turning shaft 22. Therefore, there is a correlation between the rotation angle $\theta_b$ of the turning motor 31 and the pinion angle $\theta_p$. Using this correlation, the pinion angle $\theta_p$ can be evaluated from the rotation angle $\theta_b$ of the turning motor 31. The pinion shaft 21 engages with the turning shaft 22. Therefore, there is a correlation also between the pinion angle $\theta_p$ and the movement amount of the turning shaft 22. That is, the pinion angle $\theta_p$ is a value that reflects the turning angle $\theta_w$ of the turning wheel 6.

The target pinion angle computation unit 62 computes a target pinion angle $\theta_{p1}$* based on the steering angle $\theta_s$, that is computed by the steering angle computation unit 51. The target pinion angle $\theta_{p1}$* is a target angle of the pinion angle $\theta_p$. The target pinion angle computation unit 62 computes the target pinion angle $\theta_{p1}$* such that a rudder angle ratio set depending on a product specification and the like is realized. The rudder angle ratio is the ratio of the turning angle $\theta_w$ to the steering angle $\theta_s$.

For example, the target pinion angle computation unit 62 sets the rudder angle ratio depending on the traveling state of the vehicle, as exemplified by the vehicle velocity V, and computes the target pinion angle $\theta_{p1}$* depending on the set rudder angle ratio. The target pinion angle computation unit 62 computes the target pinion angle $\theta_{p1}$* such that the turning angle $\theta_w$ with respect to the steering angle θ, is larger as the vehicle velocity Vis lower. The target pinion angle computation unit 62 computes the target pinion angle $\theta_{p1}$* such that the turning angle $\theta_w$ with respect to the steering angle $\theta_s$ is smaller as the vehicle velocity V is higher. For realizing the rudder angle ratio set depending on the traveling state of the vehicle, the target pinion angle computation unit 62 computes a correction angle for the steering angle $\theta_s$, adds the computed correction angle to the steering angle $\theta_s$, and thereby, computes the target pinion angle $\theta_{p1}$* depending on the rudder angle ratio.

Depending on the product specification and the like, the target pinion angle computation unit 62 may compute the target pinion angle $\theta_{p1}$*, such that a rudder angle ratio of "1:1" is obtained, regardless the traveling state of the vehicle.

The final target pinion angle computation unit 63 takes the target pinion angle $\theta_{p1}$* that is computed by the target pinion angle computation unit 62 and the value of the turning keeping flag FG that is set by the external tool 46. In the case where the value of the turning keeping flag FG is "OFF", the final target pinion angle computation unit 63 sets a final target pinion angle $\theta_{p2}$*, to the target pinion angle $\theta_{p1}$* that is computed by the target pinion angle computation unit 62. In the case where the value of the turning keeping flag FG is "ON", the final target pinion angle computation unit 63 sets the final target pinion angle $\theta_{p2}$*, to a value corresponding to the particular position of the turning shaft 22, regardless of the target pinion angle $\theta_{p1}$* that is computed by the target pinion angle computation unit 62. In the case where the particular position is the neutral position of the turning shaft 22, the value of the final target pinion angle $\theta_{p2}$* is "0". The value corresponding to the particular position of the turning shaft 22 is stored in the memory.

In the case where the value of the turning keeping flag FG is not taken from the external tool 46, the final target pinion angle computation unit 63 sets the final target pinion angle $\theta_{p2}$*, to the target pinion angle $\theta_{p1}$* that is computed by the target pinion angle computation unit 62. The case where the value of the turning keeping flag FG is not taken from the external tool 46 is a case where the external tool 46 is not connected to the in-vehicle network 45, for example.

The pinion angle feedback control unit 64 takes the final target pinion angle $\theta_{p2}$* that is computed by the final target pinion angle computation unit 63 and the pinion angle $\theta_p$ that is computed by the pinion angle computation unit 61. The pinion angle feedback control unit 64 computes a turning torque command value $T_p$*, through a feedback control of the pinion angle $\theta_p$, such that the pinion angle $\theta_p$ follows the final target pinion angle $\theta_{p2}$*. The turning torque command value $T_p$* is a command value for the torque that is generated by the turning motor 31, and is a target value of the turning force.

The energization control unit 65 supplies an electric power depending on the turning torque command value $T_p$*, to the turning motor 31. Specifically, the energization control unit 65 computes a current command value for the turning motor 31, based on the turning torque command value $T_p$*. The energization control unit 65 detects the value of an electric current $I_b$ that is generated on an electricity supply path to the turning motor 31, through a current sensor 66 provided on the electricity supply path. The value of the electric current $I_b$ is the value of the electric current that is supplied to the turning motor 31. The energization control unit 65 evaluates the deviation between the current command value and the value of the electric current $I_b$, and controls the electricity supply to the turning motor 31 such that the deviation is eliminated. Thereby, the turning motor 31 generates the torque depending on the turning torque command value $T_p$*.

Lock Process of Turning Shaft 22

Next, the lock process of the turning shaft 22 will be described.

For example, the lock process of the turning shaft 22 is executed when a wheel alignment is adjusted in a vehicle production plant or a vehicle dealer. The adjustment of the wheel alignment is a work relevant to the maintenance of the vehicle, and for example, includes a work in which the worker adjusts a toe angle, a camber angle, and a caster angle by operating the steering mechanism 3 or the turning mechanism 4. The adjustment of the wheel alignment is performed in a state where the steering device 2 is equipped in the vehicle and where an electric power source of the vehicle is turned on. That is, the adjustment of the wheel alignment is performed in a state where the reaction force control by the reaction force control device 1A or the turning control by the turning control device 1B can be executed. As for the propulsion of the vehicle, the vehicle is at a stop.

When the adjustment of the wheel alignment is performed, the external tool 46 is connected to the in-vehicle network 45. The external tool 46 requests the turning control device 1B to keep the turning shaft 22 at the particular position. That is, the external tool 46 sets the value of the turning keeping flag FG to "ON". The particular position is the neutral position of the turning shaft 22.

In the case where the value of the turning keeping flag FG is "ON", the turning control device 1B starts the execution of the lock process. The turning control device 1B sets the final target pinion angle $\theta_{p2}$*, to the value corresponding to the particular position of the turning shaft 22. Since the particular position is the neutral position of the turning shaft 22, the turning control device 1B sets the final target pinion angle $\theta_{p2}$* to "0". The turning control device 1B computes the difference between the final target pinion angle $\theta_{p2}$* and the target pinion angle $\theta_{p1}$* that is computed based on the steering angle $\theta_s$, and drives the turning motor 31 such that the computed difference becomes "0".

That is, in the case where the position of the turning shaft 22 is different from the neutral position, the turning control device 1B controls the turning motor 31 such that the position of the turning shaft 22 returns to the neutral position. Therefore, the position of the turning shaft 22 is kept at the neutral position. Accordingly, the adjustment of the wheel alignment can be appropriately performed.

When the keeping of the position of the turning shaft 22 becomes unnecessary, for example, when the adjustment of the wheel alignment is completed, the external tool 46 requests the turning control device 1B to end the execution of the lock process. That is, the external tool 46 sets the value of the turning keeping flag FG to "OFF". In the case where the value of the turning keeping flag FG is "OFF", the turning control device 1B ends the execution of the lock process.

Effects of Embodiment

The embodiment exerts the following effects.

(1) For example, when the maintenance of the vehicle is performed, the position of the turning shaft 22 is sometimes demanded to be kept at a particular position. In the embodiment, the turning control device 1B executes the lock process based on the command from the exterior. Thereby, the position of the turning shaft 22 is kept at the particular position. Therefore, the maintenance of the vehicle can be appropriately performed. For example, the command from the exterior is the value of the turning keeping flag FG.

(2) In the case where the turning control device 1B executes the lock process, the position of the turning shaft 22 is kept at the particular position based on the command from the exterior, regardless of the target pinion angle $\theta_{p1}$* that is computed by the target pinion angle computation unit 62, and further the steering state of the steering wheel 5. Therefore, even in the case where the steering wheel 5 unintentionally operates when the maintenance of the vehicle is performed, it is possible to reduce the influence of the operation of the steering wheel on the maintenance of the vehicle. This is effective, particularly, in the maintenance of the vehicle for the adjustment of the turning mechanism 4, as exemplified by the adjustment of the wheel alignment.

(3) The turning control device 1B takes the command from the external tool 46. The position of the turning shaft 22 can be kept at the particular position, simply by sending the command from the external tool 46. Therefore, the maintenance of the vehicle can be easily performed.

(4) The particular position is the neutral position of the turning shaft 22 that corresponds to the straight movement state of the vehicle. The position of the turning shaft 22 can be kept at the neutral position, through the execution of the lock process. Therefore, it is possible to appropriately perform a work that is relevant to the maintenance of the vehicle and for which the straight movement property of the vehicle is demanded to be ensured. For example, the work includes the adjustment work for the wheel alignment. Accordingly, it is possible to appropriately perform the adjustment work for the wheel alignment, through the execution of the lock process. Further, it is possible to attach components such as the turning wheels 6, in a state where the straight movement property of the vehicle is ensured.

(5) The turning control device 1B executes the lock process when the vehicle is at a stop. The lock process is performed in a state where the vehicle is at a stop. Therefore, it is possible to keep the position of the turning shaft 22 at the particular position, while securing safety.

Other Embodiment

The embodiment may be carried out while being modified as follows.

The position of the turning shaft 22 may be kept at a position other than the neutral position. Depending on the work content for the maintenance, the position of the turning shaft 22 is demanded to be kept at the position other than the neutral position. For example, the position other than the neutral position includes an end position of the turning shaft 22. The end position is a limit position in a physically movable range of the turning shaft 22. Thereby, it is possible to meet the demand depending on the work content for the maintenance.

Instead of setting the value of the turning keeping flag FG, the external tool 46 may give an instruction indicating a value of the final target pinion angle $\theta_{p2}$* that corresponds to the keeping position of the turning shaft 22, to the turning control device 1B. For example, in the case where the position of the turning shaft 22 is kept at the neutral position, the external tool 46 gives an instruction indicating that the value of the final target pinion angle $\theta_{p2}$* is set to "0", to the turning control device 1B.

What is claimed is:

1. A steering control device configured to control a steering device including:

a turning shaft configured to turn a turning wheel of a vehicle, dynamic power transmission between the turning shaft and a steering wheel being separated; and a turning motor configured to generate a torque that is given to the turning shaft, the steering control device comprising one or more processors configured to:

control drive of the turning motor depending on a steering state of the steering wheel; and execute a lock process based on a command from an exterior of the steering control device, in a state where the steering device is equipped in the vehicle, the lock process being a process of driving the turning motor such that a position of the turning shaft is kept at a particular position.

2. The steering control device according to claim 1, wherein the lock process is a process of driving the turning motor such that the position of the turning shaft is kept at the particular position, regardless of the steering state of the steering wheel.

3. The steering control device according to claim 1, wherein the particular position is a neutral position of the turning shaft, the neutral position corresponding to a straight movement state of the vehicle.

4. The steering control device according to claim 1, wherein the particular position is an end position that is a limit position in a physically movable range of the turning shaft.

5. The steering control device according to claim 1, wherein the one or more processors are configured to execute the lock process when the vehicle is at a stop.

6. A steering control method for controlling a steering device including:

a turning shaft configured to turn a turning wheel of a vehicle, dynamic power transmission between the turning shaft and a steering wheel being separated; and a turning motor configured to generate a torque that is given to the turning shaft, the steering control method comprises:

executing a lock process by one or more processors, based on a command from an exterior of the steering device, in a state where the steering device is equipped in the vehicle, the lock process being a process of driving the turning motor such that a position of the turning shaft is kept at a particular position, regardless of a steering state of the steering wheel.

* * * * *